United States Patent [19]

Kobayashi et al.

[11] Patent Number: 5,142,528
[45] Date of Patent: Aug. 25, 1992

[54] PROTOCOL SELECTOR AND PROTOCOL SELECTION METHOD

[75] Inventors: Atsushi Kobayashi; Kimitoshi Yamada, both of Hadano; Toru Horimoto, Atsugi, all of Japan

[73] Assignee: Hitachi, Ltd., Tokyo, Japan

[21] Appl. No.: 473,913

[22] Filed: Feb. 2, 1990

[30] Foreign Application Priority Data

Feb. 6, 1989 [JP] Japan ................................ 1-25904

[51] Int. Cl.⁵ .......................................... H04J 3/12
[52] U.S. Cl. .................................. 370/79; 370/110.1
[58] Field of Search ............... 370/58.1, 60, 110.1, 370/58.2, 79, 85.1, 94.1

[56] References Cited

U.S. PATENT DOCUMENTS

| 4,926,415 | 5/1990 | Tawara et al. ................ 370/60 |
| 4,985,887 | 1/1991 | Mizuhara et al. ............. 370/60 |
| 5,008,879 | 4/1991 | Fischer et al. ............... 370/84 |
| 5,012,470 | 4/1991 | Shobu et al. ................. 370/84 |

FOREIGN PATENT DOCUMENTS 61-127251  6/1986  Japan .

Primary Examiner—Douglas W. Olms
Assistant Examiner—Melvin Marcelo
Attorney, Agent, or Firm—Antonelli, Terry, Stout & Kraus

[57] ABSTRACT

In communication which uses a communication line which allows the determination of a communication protocol in a communication port prior to the communication like in an ISDN network, a communication program corresponding to the determined communication protocol is dynamically linked and initialized to allow dynamic selection of the communication protocol.

13 Claims, 4 Drawing Sheets

PROTOCOL SELECTOR AND PROTOCOL SELECTION METHOD

BACKGROUND OF THE INVENTION

The present invention relates to a communication control unit which allows the effective utilization of a single communication line by dynamically selecting various types of communication protocols, and more particularly to a protocol selector and a protocol selection method in a communication control unit which allows the selection of a communication protocol by negotiation with a communicating communication control unit.

In the past, the communication between terminal devices or between a host and a terminal device has been done by utilizing a closed area network or an exclusive line network which operates with a switching system connecting those terminal devices or host. Accordingly, the communication protocol used for each equipment is fixedly determined for each equipment. As a result, communication between equipments having different communication protocols is in fact not attained or possible in such systems.

A prior art for solving the above problem is disclosed in JP-A-61-263352 and JP-A-61-127251. In the system disclosed in JP-A-61-263352, where a plurality of types of different terminal devices are connected on a subscriber line, means for indicating the usage status of the respective terminal devices to a calling terminal device when the terminal devices receive a call is provided on the subscriber line so that the calling terminal device may execute a communicatable call set request. Namely, means for indicating a communicatable protocol from the receiving terminal device is used to select the protocol in the calling terminal device.

In the art disclosed in JP-A-61-127251, where a terminal device which can process a plurality of protocols is connected to a subscriber line, a program which corresponds to the protocol designated by a calling terminal device is loaded when the call is received so that a plurality of protocol processes can be executed on a single subscriber line. Namely, a communicatable protocol is recognized by the called terminal device which will then select and execute the protocol.

However, in the system disclosed in JP-A-61-263352, only means for allowing the calling terminal device to select the communicatable communication protocol unit of the called terminal device is available when the calling terminal device calls, and no consideration is given to the dynamic selection of the communication protocol of the calling terminal device by the protocol of the communication control unit of the destination terminal device when terminal device is called or calls. Accordingly, the type of destination terminal device which is communicatable with a calling terminal device is limited.

In the prior art communication control unit, the selection and initialization information of the protocols for the respective layers which process a communication frame is one which has been preset by a user prior to the communication. Such information stored in an auxiliary memory is fetched at the time of start of the communication program to effect an initialization. Accordingly, the generated port cannot operate in other than the initially set protocol.

Where the above system is applied to an ISDN in which the utilization format of the communication line is negotiable, the communication protocol is fixedly determined for each B channel which is the communication port, and it is not possible to select an optimum line utilization format in accordance with a request of an application program or effect communication in response to a communication request if a vacant generated B channel which matches a protocol of the destination terminal device is not available.

Further, in the system disclosed in JP-A-61-263352, only the means for dynamically selecting the protocol designated by the calling terminal device, in the called terminal device when it receives a call is provided, and no consideration is given to simultaneous operation of a plurality of protocols in one communication layer. Accordingly, during communication with a called terminal device, the communication in another protocol cannot be attained.

It is an object of the present invention to solve the problems encountered in the prior art units and provide a protocol selector and a protocol selection method in a communication control unit which can dynamically determine a protocol of a communication port, set a coupling point of an upper layer and a lower layer so that simultaneous communication with various communication control units is attained.

SUMMARY OF THE INVENTION

In accordance with the present invention, the above object is achieved in the communication which uses a communication line which allows the determination of a communication protocol in a communication port prior to the communication, such as in an ISDN network, by dynamically linking a communication control program which corresponds to the determined communication protocol and initializing it to allow the dynamic selection of the communication protocol.

When a communication is conducted by using an ISDN network, the communication control program determines the communication protocol of the communication with the destination terminal device through the B channel, by using the D channel, which is a calling control communication port, in response to a command from the application program or a communication request from the destination terminal device, and it is linked and initialized when the communication protocol is determined.

DESCRIPTION OF THE PREFERRED EMBODIMENTS

Figure 1:
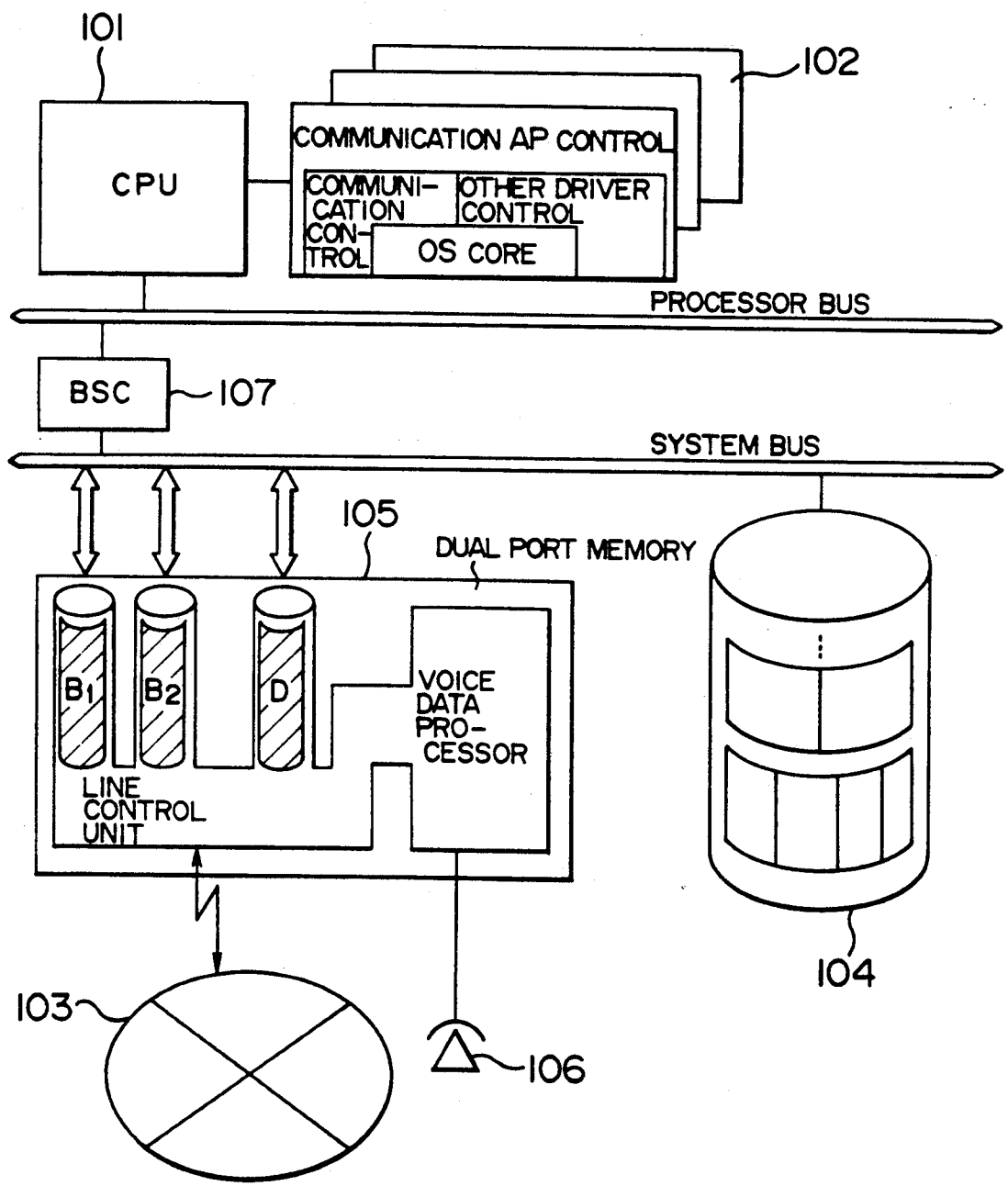
FIG. 1 shows a block diagram of one embodiment of the present invention.

One embodiment of a protocol selection method in accordance with the present invention now will be explained. In FIG. 1, numeral 101 denotes a central processing unit, numeral 102 denotes a main memory, numeral 103 denotes an ISDN network, numeral 104 denotes an auxiliary memory, numeral 105 denotes a communication control processor, numeral 106 denotes a telephone set and numeral 107 denotes a bus controller.

In the embodiment of the present invention shown in FIG. 1, the present invention is applied to the ISDN connected terminal devices. The software structure and operation thereof are logically expressed in FIG. 2.

In FIG. 1, the ISDN network 103 is a communication network for controlling switching of data and voice between the device shown in the embodiment of FIG. 1 and other devices. The main memory 102 contains a communication application program, a communication control program, various communication control programs, initialization information therefor and an I/O driver, fetched from the auxiliary memory 104. Those programs and driver are operated by the central processing unit (CPU) 101 under the control of an operating system (OS) core stored in the main memory 102. In an ISDN basic group interface, the line control processor 105 has one D channel port and two B channel ports, and has a separate voice data processor for the voice data to be handled in the B channel. The voice data is transmitted to and from the telephone set 106 through the voice data processor.

Figure 3:
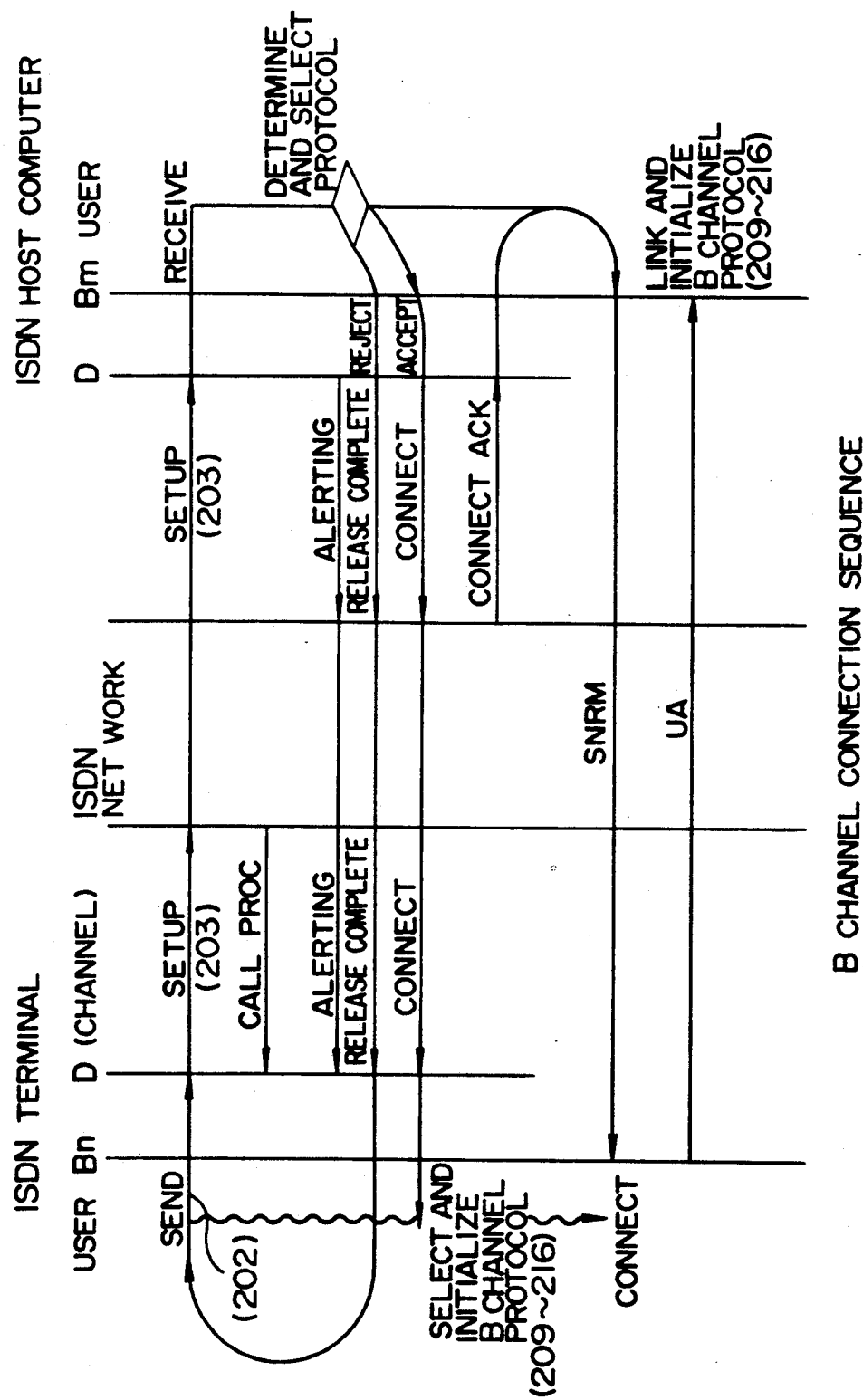
FIG. 3 illustrates a connection sequence of a B channel.
Figure 4:
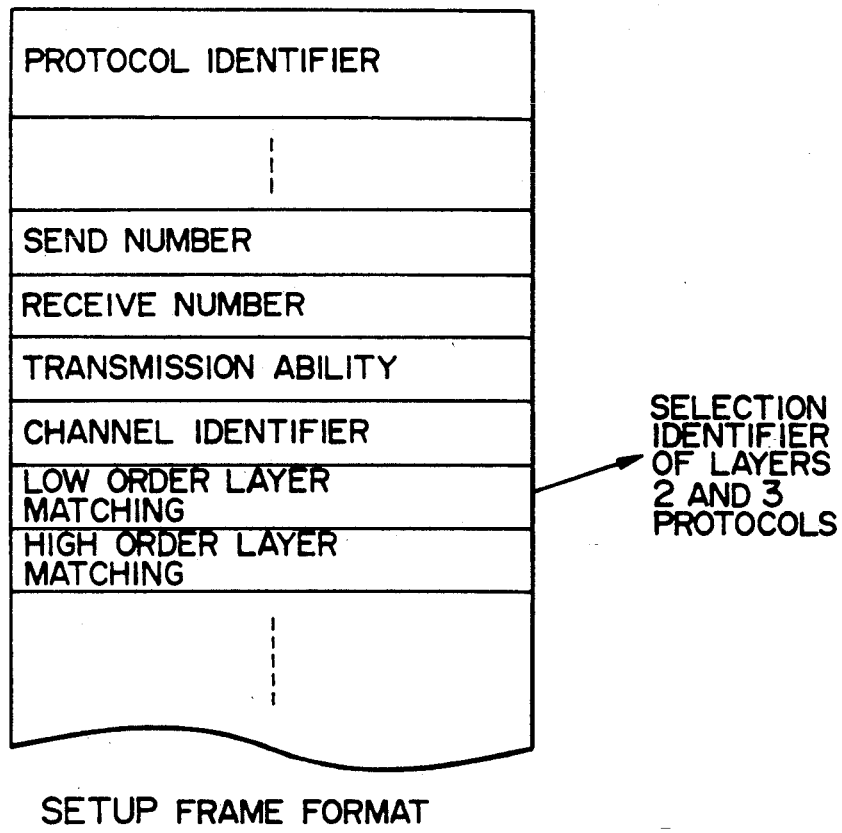
FIG. 4 shows a format of a SETUP frame which is a call set message.

The operation of the embodiment of the present invention is now explained with reference to FIGS. 2 to 4. In the present embodiment, the communication protocol comprises layers 1 to 6, and the communication control programs of the layers 1 and 2 which are low order layers of the communication control program for the respective layers corresponding to the respective layer protocols, are loaded into a $B_1$ channel control unit and a $B_2$ channel control unit in an I/O space. Each layer communication protocol has a plurality of protocols, and communication control programs corresponding to the respective communication protocols are stored in the auxiliary memory 104. The communication control programs, one from each layer, are combined so that they function as one communication protocol as a whole.

(1) When the unit is powered on, the communication control program and the I/O driver programs are loaded from the auxiliary memory 104 into the main memory 102 by the operating system core and they are initialized. The communication control program then fetches the D channel control program from the auxiliary memory 104 and loads it into a dual port memory of the line control processor 105 and opens a communication port between the D channel call control unit and the communication control program. As a result, the communication application program is ready to initiate the communication setting through the ISDN network 103 (201).

(2) When a start of communication request by the B channel is issued to the communication control program by the communication application program by designating the B channel protocol, the communication control program issues a B channel connection request to the D channel call control unit (201, 202).

(3) The D channel call control unit thus sets the connection of the ISDN network, sends a SETUP message to the connection destination station, the host computer in this case, and recognizes the protocol for the destination station. The SETUP message comprises a port indicating transmission ability of the B channel, and an identifier for designating one of the parameters of the high order layers and the low order layers of the communication protocol, that is, the layer communication control programs, and it has a format as shown in FIG. 4. When the receiving station receives the SETUP message, it determines whether it is able to communicate in the communication protocol designated by the received SETUP message. If it is able to communicate, it sends back a CONNECT message, but if it is not able to communicate, it sends back a RELEASE COMPLETE message to the sending station through the D channel. When the sending station receives the RELEASE COMPLETE message from the destination station, it changes the parameter of the protocol and resends the SETUP message, and repeats the above process until the destination station sends back the CONNECT message. When the sending station receives the CONNECT message from the destination station, the selection and setting of the protocol through the D channel is terminated (203).

(4) When the setting of the communication protocol for the B channel is completed through the above process, the communication control program of the sending station instructs the I/O driver program to load the second layer communication control program selected above from the auxiliary memory 104 to the main memory 102 and store it into the designated B channel control unit of the dual port memory. In the present embodiment, it is assumed that the layer 1 communication control program is the only one which has previously been stored in the B channel control unit (204, 205, 206).

(5) The communication control program further reads in the initial information and requests the initialization to the layer 2 communication control program (207, 208, 209).

(6) Then, the communication control program loads the determined layer 3 communication control program from the auxiliary memory 104 to the main memory 102 in the same manner as that described above, and issues the initialization request to the layer 3 communication control program by the initialization information. Further, a necessary number of service access points (SAP) are opened to the communication control programs of the higher order than the layer 3 to link them to the low order programs (210, 211, 212).

(7) The communication control program further loads, initializes and links the selected layers 4 to 6 communication control programs to finally provide a communication port to the communication application program (213, 214, 215, 216).

(8) On the other hand, when the receiving station sends the CONNECT message, it receives a CONNECT ACK message from the ISDN network 103, sends a data link set message SNRM (set normal response mode) to the sending station, and sets, links and initializes the B channel protocol in the receiving station in the same manner as that of the sending station. The receiving station may have only one available communicatable protocol.

(9) When the sending station receives the SNRM message, it sends an unnumbered acknowledge (UA) to the receiving station.

Through the above process, the sending station and the receiving station can determine the mutually acceptable communication protocol by selecting the communication control programs, one for each layer, and linking them. In this manner, the mutual communication through the B channel is attained.

In the above embodiment, the communication protocol comprises six layers, although it may comprise any number of layers, for example, one layer.

In the embodiment of the present invention, the communication line is the ISDN network. The ISDN network usually has two channels.

Figure 2:
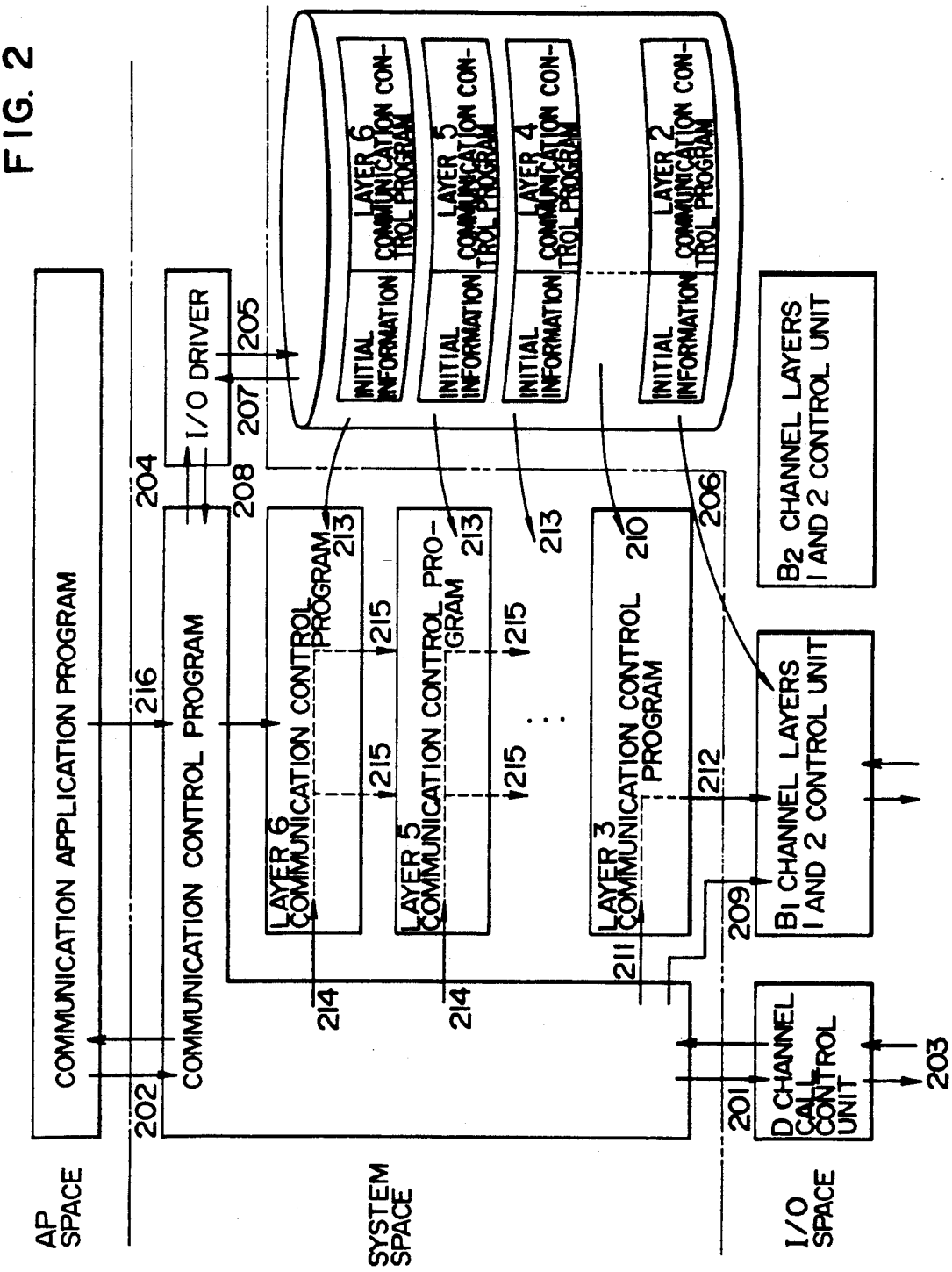
FIG. 2 shows a logical structure of a program.

Accordingly, in FIG. 2, a coupling point may be set between the respective sets of a plurality of protocols in the layer 2 communication control program of a $B_1$ channel and a $B_2$ channel which operate in a data link layer which is an I/O space, and the layer 3 communication program which operates in the lowermost layer of the system space, and the coupling point may be dynamically switched.

In this manner, in a communication which uses the ISDN network, even if one of the B channels is busy, the communication by any protocol may be attained through the same communication control unit by using the other B channel so that the B channels can be efficiently utilized.

The present configuration may be applicable to not only the communication which utilizes the ISDN network but also the communication which utilizes a plurality of B channels. In the latter case, as many coupling points as the product of the number of sets of the protocols which are operable in the uppermost layer of the data link layers and the number of B channels are provided between the communication control program of the lowermost layer which operates in the system space and the communication control program of the uppermost layer of the data link layers so that it can be dynamically switched.

In accordance with the present invention, since the communication protocol may be dynamically selected prior to the start of communication, communication with many communication media is simply attained. Particularly, the communication protocol when the B channel is used can be dynamically selected by a command from the communication application program so that the B channel can be efficiently utilized.

We claim:

1. A communication system in which communication is effected between stations utilizing a communication line which allows for the determination of a protocol of a communication port prior to communication, wherein at least one of a sending station and a receiving station is capable of operating according to a plurality of communication protocols, comprising:
   a protocol selector including means for dynamically determining a communication protocol by negotiation between sending and receiving stations prior to the communication between the stations, during which a sending station proposes a protocol to a receiving station, the receiving station accepts or rejects the proposed protocol, and, when the receiving station rejects a protocol proposed by the sending station, the sending station proposes a different protocol until the receiving station accepts a proposed protocol.

2. A protocol selector according to claim 1 wherein said communication protocol has a layered structure and is determined by arbitrarily combining layer protocols, one for each layer, in such a way that different protocol layers are linked by coupling points.

3. A protocol selector according to claim 2 wherein the number of coupling points corresponds to a product of a number of sets of protocols of data link layers, each containing a plurality of protocols, and a number of B channels which are provided between communication programs of data link layers and a high order layer for the switching of protocols of the data link on the B channel in a communication utilizing a network which can use a plurality of B channels, and including means for dynamically switching said coupling points.

4. A communication system according to claim 1, wherein said sending station includes means for sending to said receiving station a setup message having information identifying a proposed protocol, said receiving station includes means for determining whether it can operate in a proposed protocol identified in a setup message received from said sending station and for sending to said sending station a first message which accepts a proposed protocol when the receiving station can operate in the proposed protocol and a second message which requests that the sending station propose a different protocol when the receiving station can not operate in the proposed protocol.

5. A method of communicating between communication stations through a D channel and a B channel of an ISDN network, comprising:
   sending through the D channel from one of the stations to another station an identifier of a communication protocol used for communications through the B channel;
   sending a message informing that the designated communication protocol is acceptable after receiving the identifier and establishing said communication protocol in said another station; and
   establishing said communication protocol in said one station after receiving the message.

6. A method of communicating according to claim 5, wherein said communication protocol has a layered structure and is composed of layer protocols, one for each layer, where at least one of said layer protocols is selected from a plurality of protocols prepared for the layer.

7. A method of communicating according to claim 6, wherein said communication station is equipped with a plurality of B channel ports; a plurality of different layer protocols are established for enabling said B channel ports to operate in a second layer; a coupling point is provided between a third layer communication control program and second layer communication control programs each supporting a different layer protocol; and the coupling point is dynamically switched in order to connect the third layer communication control program and any one of the second layer communication control programs.

8. A communication system for communicating between communication stations through a D channel and a B channel of an ISDN network, comprising:
   a first station sending through the D channel toward a second station an identifier of a communication protocol used for communications through the B channel; and
   the second station sending a message informing that the designated communication protocol is acceptable if positive after receiving the identifier and establishing said communication protocol, while said first station establishes said communication protocol after receiving the message.

9. A communication system according to claim 8, wherein said communication protocol has a layered structure and is composed of layer protocols, one for each layer, where at least one of said layer protocols is selected from a plurality of protocols prepared for the layer.

10. A communication system according to claim 9, wherein said communication station is equipped with a plurality of B channel ports; a plurality of different layer protocols are established for enabling said B channel ports to operate in a second layer; a coupling point is provided between a third layer communication control program and second layer communication control programs each supporting a different layer protocol; and the coupling point is dynamically switched in order to connect the third layer communication control program and any one of the second layer communication control programs.

11. A method of communicating between communication stations through a D channel and a B channel of an ISDN network, comprising:
   (a) sending through the D channel from a sending station to a receiving station an identifier of a communication protocol to be used for communications between said sending and receiving stations through the B channel;
   (b) sending a release message from the receiving station to the sending station indicating that the protocol identified by said identifier is not acceptable;
   (c) responding in said release message in said sending station by sending to said receiving station an identifier of another communication protocol on said D channel;
   (d) repeating steps (b) and (c) until said receiving station accepts a communication protocol identified by an identifier received from the sending station; and then
   (e) sending a connect message from said receiving station to said sending station that the protocol indicated by the identifier is acceptable; and
   (f) establishing the accepted communication protocol in said sending and receiving stations.

12. A method of communicating according to claim 11, wherein said communication protocol has a layered structure and is composed of layer protocols, one for each layer, where at least one of said layer protocols is selected from a plurality of protocols prepared for the layer.

13. A method of communicating according to claim 12, wherein said communication station is equipped with a plurality of B channel ports; a plurality of different layer protocols are established for enabling said B channel ports to operate in a second layer; a coupling point is provided between a third layer communication control program and second layer communication control programs each supporting a different layer protocol; and the coupling point is dynamically switched in order to connect the third layer communication control program and any one of the second layer communication control programs.

* * * * *